US012810744B2

(12) United States Patent
Huang et al.

(10) Patent No.: US 12,810,744 B2
(45) Date of Patent: Nov. 24, 2026

(54) VIRTUAL REALITY SYSTEM OF ACUPUNCTURE

(71) Applicant: China Medical University, Taichung City (TW)

(72) Inventors: Sheng-Teng Huang, Taichung City (TW); Wei-Te Huang, Taichung City (TW); Chin-Wei Chang, Taichung City (TW); Mien-Chie Hung, Taichung City (TW); Jaung-Geng Lin, Taichung City (TW); Mao-Feng Sun, Taichung City (TW); Kun-San Chao, Taichung City (TW); Shi-Chen Ou, Taichung City (TW); Yu-Chuan Lin, Taichung City (TW); Hao-Hsiu Hung, Taichung City (TW); Ting-Yu Huang, Taichung City (TW); Po-En Chen, Taichung City (TW)

(73) Assignee: China Medical University, Taichung City (TW)

( * ) Notice: Subject to any disclaimer, the term of this patent is extended or adjusted under 35 U.S.C. 154(b) by 180 days.

(21) Appl. No.: 18/404,890

(22) Filed: Jan. 5, 2024

(65) Prior Publication Data

US 2024/0233572 A1 Jul. 11, 2024

Related U.S. Application Data

(60) Provisional application No. 63/478,696, filed on Jan. 6, 2023.

(51) Int. Cl.

*G09B 19/00* (2006.01)
*G06F 3/01* (2006.01)

(Continued)

(52) U.S. Cl.

CPC .............. *G09B 19/00* (2013.01); *G06F 3/011* (2013.01); *G09B 5/06* (2013.01); *G09B 7/00* (2013.01)

(58) Field of Classification Search

CPC .. G09B 19/00; G09B 5/06; G09B 7/00; G06F 3/011

See application file for complete search history.

(56) References Cited

U.S. PATENT DOCUMENTS

| | | | | |
|---|---|---|---|---|
| 2010/0202001 A1* | 8/2010 | Miller | G16H 50/50 | 358/1.9 |
| 2014/0214134 A1* | 7/2014 | Peterson | A61N 1/36139 | 607/62 |

(Continued)

FOREIGN PATENT DOCUMENTS

| | | | | |
|---|---|---|---|---|
| CN | 101958079 A | * | 1/2011 | G09B 23/28 |
| CN | 110827597 A | * | 2/2020 | G09B 23/28 |

*Primary Examiner* — Jack Yip

(74) *Attorney, Agent, or Firm* — Hannah Tien

(57) ABSTRACT

A virtual reality acupuncture system contains a virtual reality device comprising: a head-mounted display for viewing a virtual scene model and a mannequin, and a joystick for tracking hand movements for needle insertion determination; an computing host that transmits data with a head-mounted display and constructs an acupoint database, and an acupuncture virtual reality application which is executed to build a virtual reality model, in which the acupuncture virtual reality application constructs a situational scene model for simulating the actual condition of the consultation room; and a virtual 3D spherical acupoint model of the human body, which has a sphere area located at a certain depth below the skin surface, and has a skin distance model, so that the needle can sense the distance depth after touching the skin, which can be used to determine whether the needle position is not outside the sphere area.

12 Claims, 12 Drawing Sheets

(51) Int. Cl.

| | |
|---|---|
| ***G09B 5/06*** | (2006.01) |
| ***G09B 7/00*** | (2006.01) |

(56) References Cited

U.S. PATENT DOCUMENTS

| | | | | |
|---|---|---|---|---|
| 2017/0156982 | A1* | 6/2017 | Oda | G06F 3/04815 |
| 2017/0252108 | A1* | 9/2017 | Rios | G16H 40/63 |
| 2018/0296794 | A1* | 10/2018 | Clark | A61K 38/095 |
| 2020/0126297 | A1* | 4/2020 | Tian | G06T 7/0012 |
| 2022/0031565 | A1* | 2/2022 | Yim | A61H 39/002 |
| 2024/0173207 | A1* | 5/2024 | Yi | A61H 39/02 |
| 2025/0131672 | A1* | 4/2025 | Bustany | A61B 5/1077 |

* cited by examiner

VIRTUAL REALITY SYSTEM OF ACUPUNCTURE

FIELD OF THE INVENTION

The present invention relates to the use of Unity software to make a program for acupuncture virtual reality application, which comprises clarifying teaching needs, functional planning, process design, situational scene model, 3D human model, posture position, acupoint location and information, practice and test mode, UI/UX interface design, etc. Through the operation of the acupuncture virtual reality model, students are familiar with acupoint information and location, and through gamified learning and quizzes, students' learning fun and learning effectiveness are enhanced.

BACKGROUND OF THE INVENTION

In the current technology, CN101958079A discloses a positioning model of meridian acupuncture points (hereinafter referred as acupoints) in 3D virtual human anatomical tissue, which is used for a 3D virtual human model for acupuncture and moxibustion and is directed to identify the depth and orientation of the needle, in which the 3D virtual mannequin includes the positioning model in the images of human skeletal system, skeletal muscle system and skin-wrapped skeletal muscle system.

CN106448314A discloses a 3D model (including the location and medical function information of all acupoints, main symptoms and acupuncture methods), through virtual realization technology to allow operators to practice traditional Chinese medicine acupoints in a virtual environment; furthermore, the use of acupuncture sensors and VR technology cooperated with 3D human body and meridians to avoid puncture errors and improve the accuracy of acupuncture.

CN107689187A discloses a kind of acupuncture and acupuncture auxiliary teaching system based on virtual reality technology, in which the simulation training system is added with acupuncture sensors, and a full 3D virtual environment is established through virtual reality technology, so that users can interact with the human model.

CN106327983A is a tracing practice system based on virtual reality-based traditional Chinese medicine meridian, using a standard human anatomy tissue model, suggesting the relative 3D world relationship of space, using the 3D scene to transform the 2D screen coordinates with the 3D scene, and then marking the meridian tracing path of the human body, which is a tracing practice system based on virtual reality-based meridian integrated with a correct meridian tracing data recording center, a trait practice evaluation system and a 3D scene teaching.

CN109885156A is mainly a system for assessing learning outcomes, with an interactive teaching system and the depth and orientation of acupuncture.

CN107221000A and CN1413566A are methods of combining virtual 3D models with real people, which have achieved precise positioning of acupoints, which belongs to the category of integrated augmented reality (AR) and virtual reality (VR) applications.

SUMMARY OF THE INVENTION

The present invention is a virtual reality acupuncture system contains a virtual reality device comprising: a head-mounted display for viewing a virtual scene model and a human acupoint model, and a joystick for tracking hand movements for needle insertion judgment; an computing host that transmits data with a head-mounted display and constructs an acupoint database, and an acupuncture virtual reality application which is executed to build a virtual reality model, in which the acupuncture virtual reality application constructs a situational scene model for simulating the actual condition of the consultation room; and a virtual 3D spherical acupoint model of the human body, which has a sphere area located at a certain depth below the skin surface, and has a skin distance model, so that the needle can sense the distance depth after touching the skin, which can be used to determine whether the needle position is not outside the sphere area.

DETAILED DESCRIPTION OF THE INVENTION

Figure 1:
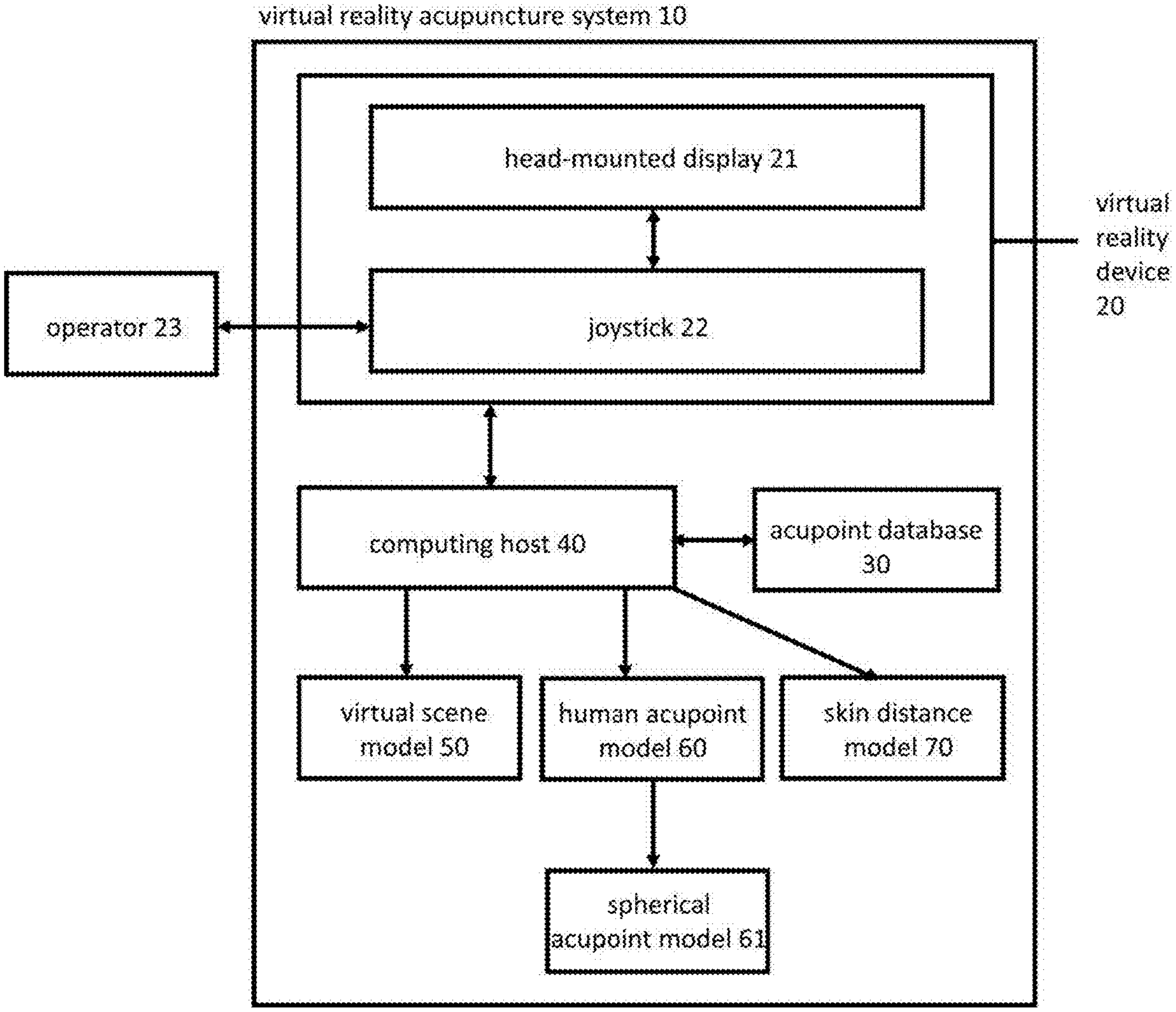
FIG. 1 shows a block diagram of the present invention.
Figure 2:
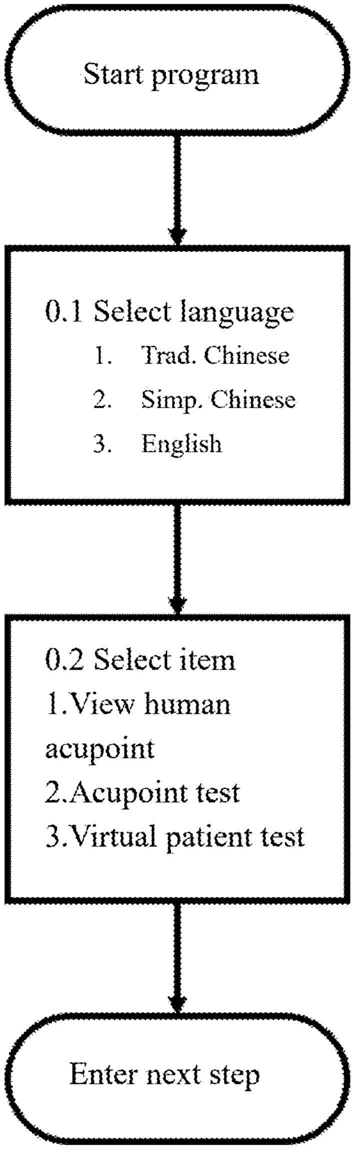
FIG. 2 shows the start-up flow chart of the present invention.

One of the purposes of the present invention is mainly applied to improve acupuncture education, and the past 2D learning mode is converted into 3D space. The development is mainly carried out from two aspects. The first is the traditional meridian acupoint teaching through the immersive virtual reality system, the traditional acupoint identification and acupoint teaching is upgraded to 3D space and combined with the best posture to teach the correct way to take acupoints, and with cursor selection, the operator can watch the acupoint description in real time to deepen the impression. This teaching mode not only allows the operator to watch the local acupoints of multiple meridians to learn the similarities and differences, but also understands the specific acupoints to deepen the learning impression.

Another object of the present invention is to establish a self-test mode, which comprises different levels of difficulty. The simple version allows the operator to identify acupoints and to select the correct acupoints from the panel by assisting in the acupoints' calibration and anatomical position cues. The advanced version eliminates the assisting prompts and requires the operator to use the finger-cun measurement of the same body method to simulate the way of taking clinical acupoint. At this condition, it is quite close to the real situation, which can be used to replace the traditional paper-and-pencil test, and to bring the vivid teaching in a visual and even interactive way. Finally, a situational model is established to simulate the actual consultation, allowing the operator to face a random virtual patient to diagnose, formulate a treatment plan, and complete acupuncture treatment. In addition to being closer to the clinical situation, it also hopes that the interesting situational mode will increase the learning willingness to achieve the higher learning effect with less effort.

In addition, traditional acupuncture learning relies on paper-based learning and lacks the authenticity of taking 3D acupuncture. It must be taught in small classes, but this practice is time-intensive and often ineffective, and it is not easy to evaluate the effect, and it is not easy for students to understand the anatomy near the acupoints. Therefore, the further object of the present invention is to establish this learning system, not only to allow the operator to combine the acupoints with 3D anatomical structure in the process of learning, but also to have basic and advanced tests to check themselves, and to design clinical objective structural tests to evaluate learning effectiveness, and even for the national skills examination.

The present invention is used for acupuncture teaching to convert traditional paper knowledge into 3D model learning, and two new features are added to this model as follows:

One feature is a human acupoint model making different positioning changes.

Unlike other previous patents, the present invention can allow the model to perform different movements according to different meridians or acupoints to facilitate taking acupoints and greatly close to the actual clinical situation.

The other is a spherical acupoint model that can be observed from the translucent body surface of a human acupoint model.

Differencing from other previous patents that only mark acupoints on the body surface of the human acupoint model, the present invention allows the operator to truly see the condition of the acupoint under the translucent body surface, including the anatomical structure around the acupoint, which greatly improves the positioning that can only be seen on the body surface, and the condition of the acupoint under the body surface is an imagination when learning in the past.

Combining the above two features can make learning more efficient, closer to clinical, and more insightful to anatomy than learning in real person.

Therefore, the present invention provides a virtual reality acupuncture system, comprising: a virtual reality device, which comprises a head-mounted display for viewing the virtual scene model and a human acupoint model, and a joystick, which is controlled with both hands of an operator for tracking hand movements to determine a needle insertion; a acupoint database which stores acupoint information; and an computing host, which is respectively linked to the virtual reality device and the acupoint database for use in performing virtual reality and data transmission, and for executing a acupuncture virtual reality application program, wherein the acupuncture virtual reality application program builds a virtual scene model to simulate the actual condition of the clinic and construct a human acupoint model, which is a virtual 3D stereoscopic model, and has a spherical acupoint model, wherein the spherical acupoint model is a circular sphere area under a certain depth of skin surface of a subject, is defined as a 3D acupoint located with a diameter of 0.1-5 cm, preferably 0.1-3 cm, more preferably 0.5 cm, and establishes a skin distance model so that the needle provides the operator with s sense of a distance depth after touching the skin, to determine whether the acupuncture position is not located outside the sphere.

In the virtual reality acupuncture system of the present invention, the human body acupoint model can make different position changes to pose different actions according to different meridians or acupoints, wherein the position includes sitting in a middle position with elbow flexion, sitting in a middle position with elbows flexion and palms up, sitting in a middle position with elbows flexion and palms down, sitting in a middle position with shoulder abduction, supine position, prone position, lateral position, etc.

In the virtual reality acupuncture system of the present invention, the spherical acupoint model can be observed from the translucent body surface of the human acupoint model, so that the operator can truly see the condition of the acupoint under the translucent body surface, including the anatomical structure around the acupoint.

In the virtual reality acupuncture system of the present invention, the acupuncture virtual reality application program is applied to the construct for clarify teaching needs, functional planning, process design, situational scene model, 3D human body model, posture position, acupoint position and information, practice and test mode, UI/UX interface design, etc.

The virtual reality acupuncture system of the present invention can be used to perform a test method, comprising: a basic test mode and an advance test mode. In the basic test mode, the test first requires a subject to choose a position posture to achieve a simulated real situation, the test is carried out in the form of acupoint matching after the position selection is completed, and there is an automatic scoring function after the test is set within the time. In the advance test mode, the acupoints of different meridians will alternately appear in the test, and along with the different acupoints appearing, different positioning conditions will be shown to present the acupoint position. The subject must complete the determination and matching within the specified time, and the process will also be scored by automatic scoring, and at the end of the test, there will be a comparison of correct answers and subject answers to the subject for review and deepen the impression.

In the virtual reality acupuncture system of the present invention, the virtual reality acupuncture system can be used to perform a test method, comprising: objective structured clinical examination case construction and scoring. The present invention simulates an objective structured clinical examination, establishes a real classroom in virtual reality, and conducts an examination after giving the case situation the same, and the test comprises the actual examination requirements for hand washing, self-introduction, indication contraindication identification, positioning requirements, acupuncture process, after taking the acupuncture process and post-acupuncture sanitary education. After the construction of a 3D acupoint model, it is better to include whether the acupoints are correct into the test score.

The steps for embodiments of the present invention comprise:

Sorting Out the Acupoint Data of the World Health Organization Standard Meridian Acupoint Positioning:

Before establishing the virtual reality of acupuncture education, it is necessary to sort out the data. That is, the data cleaning in big data analysis. The present invention chooses to sort out and standardize the data from the book of standard acupuncture meridian acupoint positioning published by the World Health Organization, including the international code of acupoints, English name, acupoint taking method, acupoint remarks, acupuncture depth, angle, contraindications and treatment indications, and all relevant literature is organized in Chinese and English bilingual manner, so as to facilitate the use of other countries in the future. Using Excel tabulates the collated data for subsequent development into a virtual reality system.

Preliminary Virtual Reality Model Construction:

Unity software is used to create an acupuncture virtual reality application program, including clarifying teaching needs, functional planning, process design, scenario modeling, 3D human model, posture positioning, acupoint location and information, practice and test mode, UI/UX interface design, etc. Through the operation of the acupuncture virtual reality model, students are familiar with acupoint information and acupoint position, and through gamified learning and quizzes, students' learning fun and learning effectiveness are enhanced.

Construct a 3D Acupoint Model:

Acupoints are areas with 3D structure in the body. However, when looking for corresponding acupoints on the surface of the human body for compression, moxibustion or even acupuncture treatment, it is necessary to find acupoints according to the anatomical positions in textbooks, but such acupoints are only the projection points of acupoints on the surface of the skin, and only after adding depth will it be a 3D acupoint.

The present invention combines the past 3D human acupoint surface model, depth data and skeletal muscle model to construct a real "3D acupoint", so that the acupoint will become a circular sphere area at a certain depth under the skin surface. Under this model, even if the acupuncture is not carried out by the acupoint projected by the skin surface after needle insertion, it can also achieve the clinical acupuncture application of simulating the real human body, especially, in the penetrating acupoint (acupuncture more than two acupoints at the same time). The construction method is to first use the locations of the shallowest and the deepest depths of the skin surface acupoints plus the average of the shallowest and the deepest depths as sphere center of the 3D acupoints, and the deepest depth minus the shallowest depth is the diameter, if there is no deepest and shallowest depth acupoints, the 3D acupoints are located with a diameter of 0.5 cm.

The joystick in virtual reality is changed to a two-handed type, and different acupuncture needles are added to be chosen, and then the skin distance model is created so that the needle could have a distance depth after touching the skin, so that the depth of the needle could be simulated, and the angle of needle insertion was based on the angle of the skin needle.

Quiz Mode:

Basic Quiz Mode:

After the completion of the acupoint calibration model, the basic test mode is designed, and the students are required to choose a position to achieve a simulated real situation at the beginning of the test, and the test is carried out in the form of acupoint matching after the position selection is completed, and the automatic scoring function is set after the test is completed.

Advanced Quiz Mode:

In the advanced test mode, the acupoints of different meridians will appear alternately in the test, and along with the different acupoints appearing, different positioning conditions will be shown to present the acupoint position. The subject must complete the acupoint determination and matching within the specified time, the process is also scored by automatic scoring, and at the end of the test, there will be a comparison of correct answers and subject answers to the subject for review and deepen the impression.

Case Construction and Scoring of Objective Structured Clinical Examinations:

First, an objective and structured clinical examination process is formulated, including hand washing, self-introduction and patient data verification, indication and contraindication identification, positioning requirements, explanation of acupuncture process, needle removal process and post-acupuncture sanitary education, etc. After that, the clinical case is written and the scoring scale is designed as the scoring standard, and the virtual reality audio and video recording function is added to the model to replace the standardized patient, and the examiner no longer needs to score in a fixed field, and the test and correction are carried out after the case writing and model calibration are completed.

DESCRIPTION OF EMBODIMENTS

One skilled in the art readily appreciates that the present invention is well adapted to carry out the objects and obtain the ends and advantages mentioned, as well as those inherent therein. The compositions, processes and methods for producing them, and uses thereof are representative of preferred embodiments, are exemplary, and are not intended as limitations on the scope of the invention. Modifications therein and other uses will occur to those skilled in the art. These modifications are encompassed within the spirit of the invention and are defined by the scope of the claims.

According to the present invention, it firstly sorts out the "World Health Organization standard acupuncture point positioning."

The Acupoint Information is as Follows:

According to the World Health Organization's standard acupuncture point positioning and the new color map acupuncture book published by Professor Lin Zhao-Geng, an authority on acupuncture and moxibustion in Taiwan, a total of 14 meridian data of the 12 main meridians and the two Ren-Du meridians of Governor vessel and Conception vessel have been sorted out, including international codes, meridian names, acupoint names, acupoint information (Chinese and English), acupuncture depth, acupuncture angles and contraindications.

The data on the disease indications of acupuncture and moxibustion are also sorted out with reference to the 11 systems listed in the new color map of acupuncture and moxibustion, with a total of 101 indications listed in the table.

Preliminary Virtual Reality Model Construction:

The pre-planning and model construction part of the model will first be calibrated with 14 meridian acupoints, and then a VR environment will be designed on the model to design and produce a VR environment close to the clinical scene to achieve 360-degree observation of the acupoint position without dead ends. The acupoint data explanation will be used to enhance the impression of the acupoint data, and then the basic test mode will be designed to match the acupoint test.

The following examples are only used to illustrate the technical content of the present invention and do not limit the scope of the present invention. Any simple changes and modifications made in accordance with the scope of the present invention and the contents of the description of the present invention are still covered by the scope of the present invention.

Example 1: Acupoints of Teaching Mode

As shown in FIG. 1, the present invention provides a virtual reality acupuncture system 10, comprising: a virtual reality device 20, which comprises a head-mounted display 21 for viewing a virtual scene model 50 and a human acupoint model 60, and a joystick 22, which is controlled with both hands of an operator 23 for tracking hand movements to determine a needle insertion; a acupoint database 30 which stores acupoint information; and a computing host 40, which is respectively linked to the virtual reality device 20 and the acupoint database 30 for use in performing virtual reality and data transmission, and for executing a acupuncture virtual reality application program, wherein the acupuncture virtual reality application program builds a virtual scene model 50 to simulate the actual condition of the clinic and construct a human acupoint model 60, which is a virtual 3D stereoscopic model, and has a spherical acupoint model 61, wherein the spherical acupoint model 61 is a circular sphere area under a certain depth of skin surface of a subject, is defined as a 3D acupoint located with a diameter of 0.1-0.5 cm, and has a skin distance model 70 so that the needle provides the operator with s sense of a distance depth after touching the skin, to determine whether the acupuncture position is not located outside the sphere.

Figure 3:
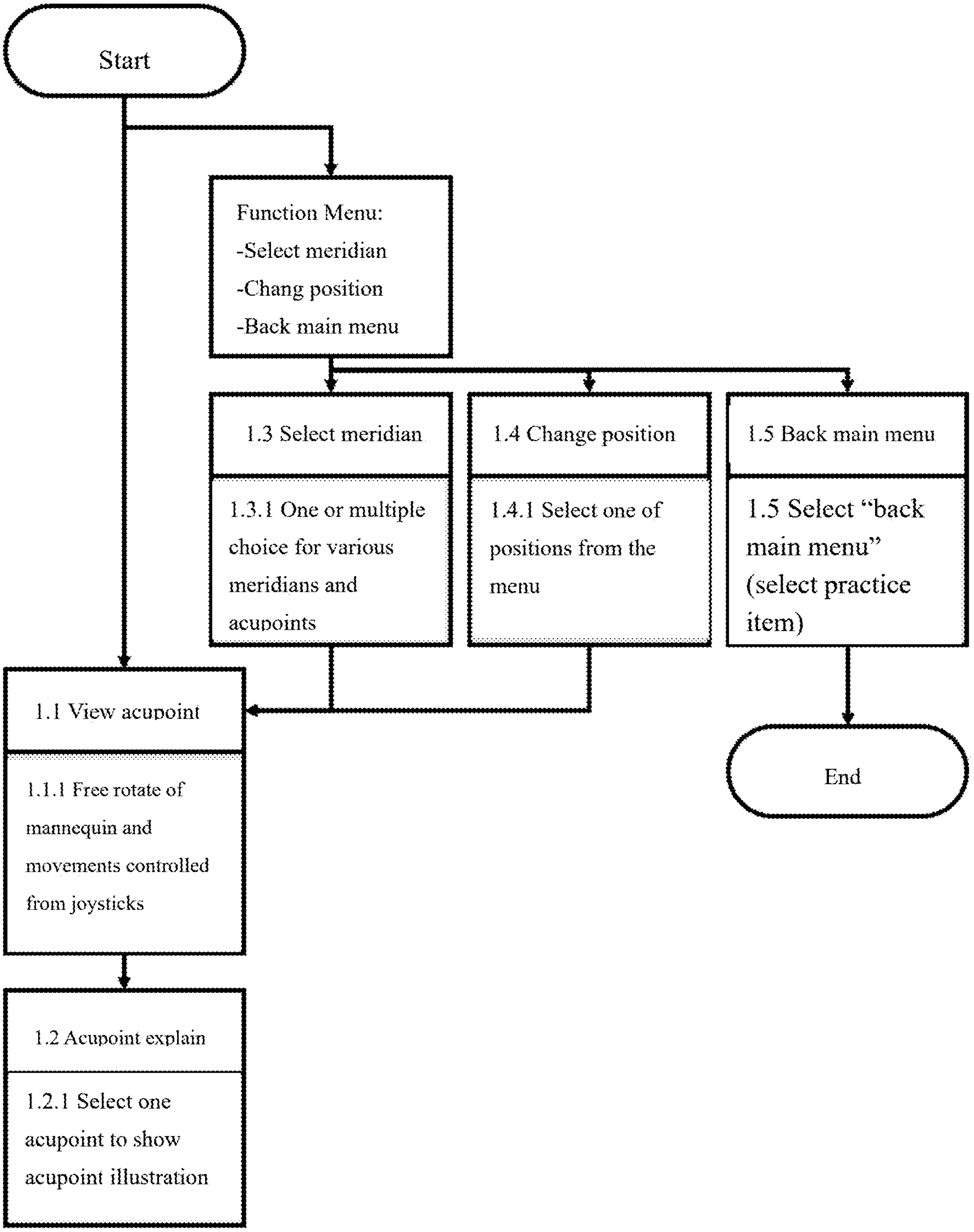
FIG. 3 shows the flow chart of the present invention to view the acupoints of the human body.
Figure 4:
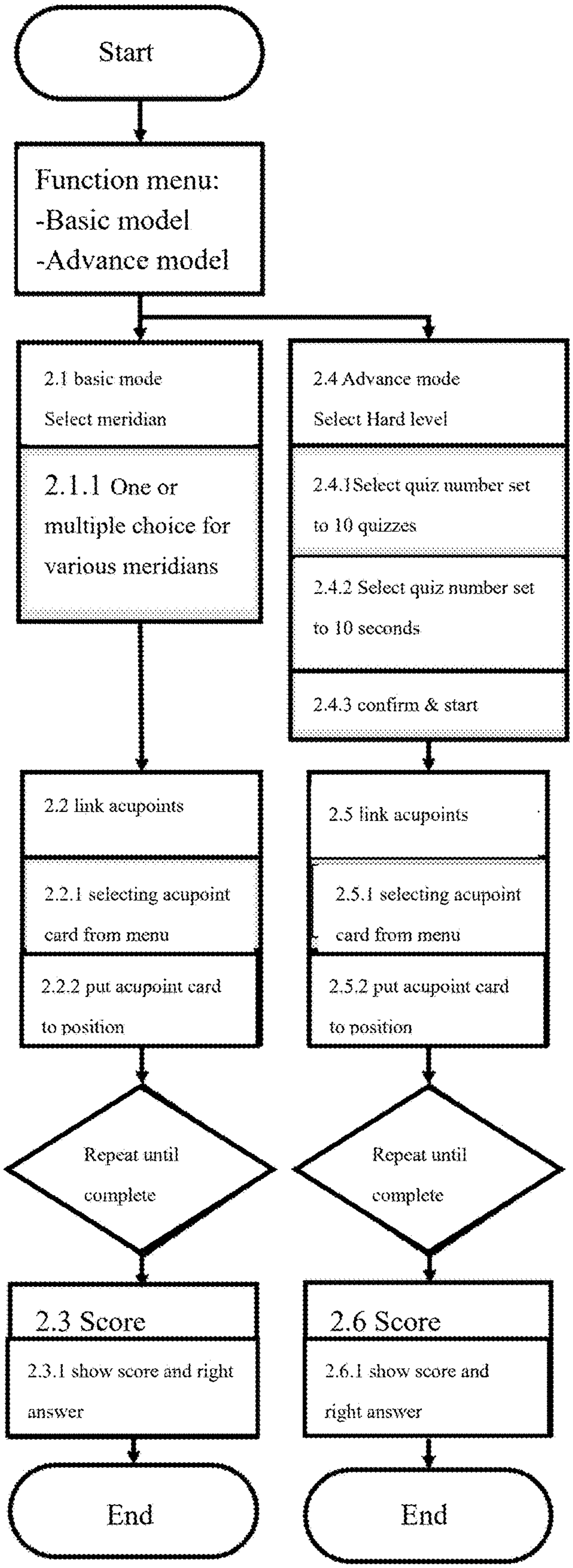
FIG. 4 shows the operation flow chart of the present invention to perform acupoint test.

Example 1 of the present invention was performed as follows: the operation of the present embodiment was carried out with an acupoint "Quchi." As shown in the flow chart in FIG. 3, the function menu was selected to enter "Select Meridians." Then the meridian "Large intestine Meridian" to which the Quchi acupoint belongs in the menu was selected, and the human acupoint model 60 was freely rotated and "Quchi" acupoint was clicked to view the explanation and icon of the acupoint.

Example 2: The Positioning of the Teaching Mode

The present invention provides the positioning of the human body acupoint model 60 as shown in Table 1:

TABLE 1

| Positioning of human body acupoint models | |
|---|---|
| A1 | Sitting in a middle position with elbows bent |
| A2 | Sitting in a middle position with elbows bent and palms up |
| A3 | Sitting in a middle position with elbows bent and palms down |
| A4 | Sitting in a middle position with shoulder abduction |
| B | Supine position |
| C | Prone position |
| D | Lateral position |

Example 2 of the present invention was performed as follows: the operation of the present embodiment was carried out with an acupoint "Huantiao." As shown in the flow chart in FIG. 3, the function menu was selected to enter the "Change Posture", then selecting the lateral position suitable for viewing the "Huantiao" in the menu, returning to the function menu, entering the "Select Meridian." Then the meridian "Bile Meridian" to which the "Huantiao" belongs in the menu was selected, the human acupoint model 60 was freely rotated and the "Huantiao" acupoint was clicked to view the explanation and icon of the acupoint.

Example 3, the Basic Mode of Virtual Patient Test

Figure 5:
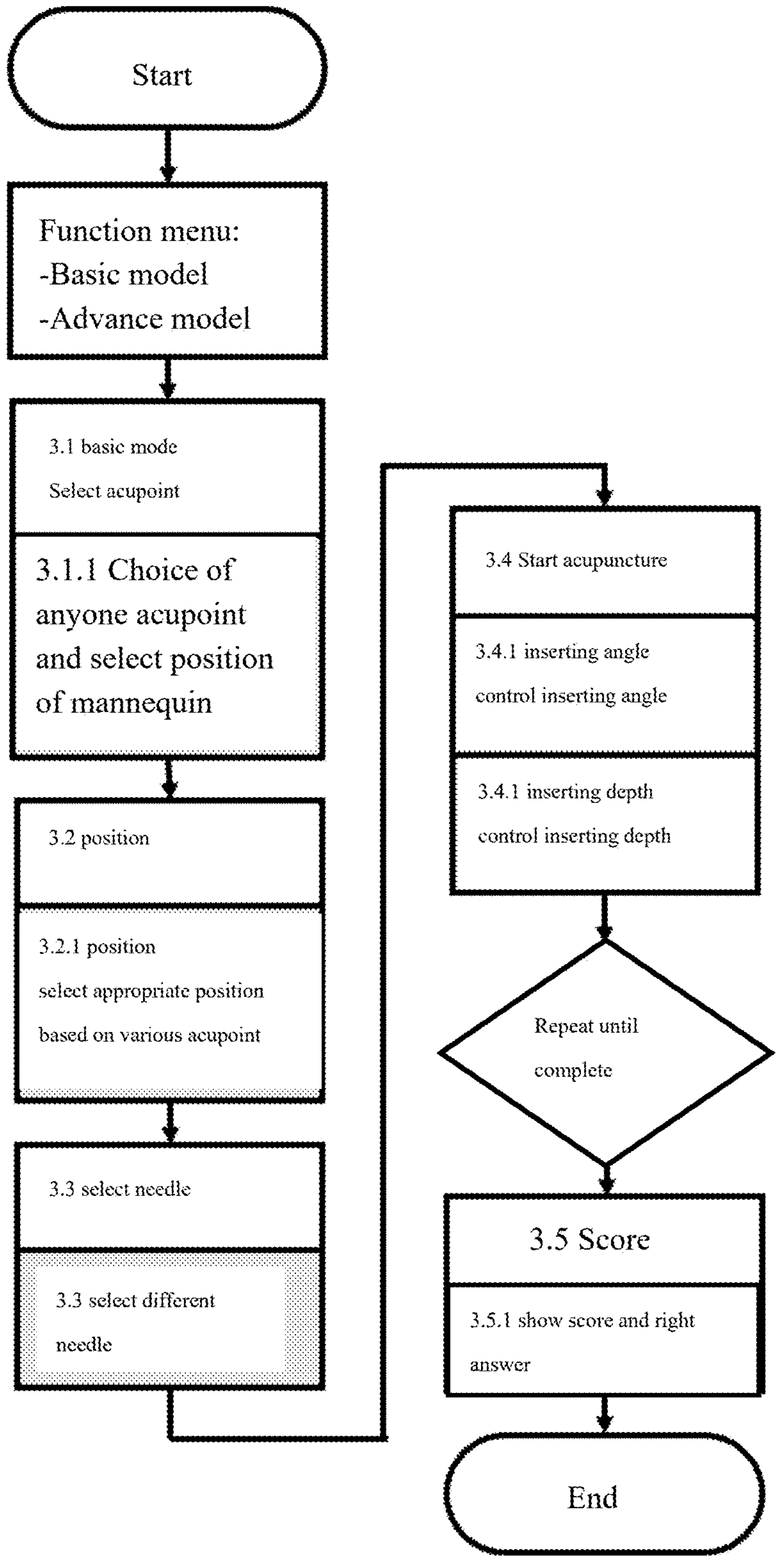
FIG. 5 shows the operation flow chart of the present invention to perform a virtual patient test.
Figure 6:
Figure 7:
Figure 8:
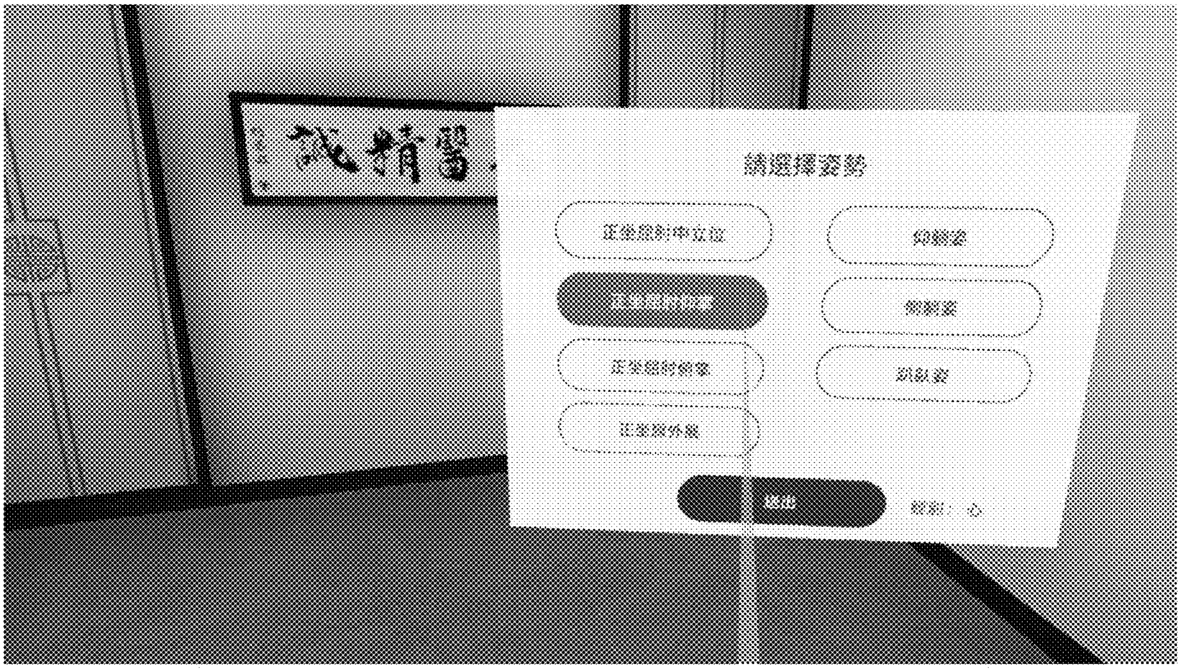
Figure 9:
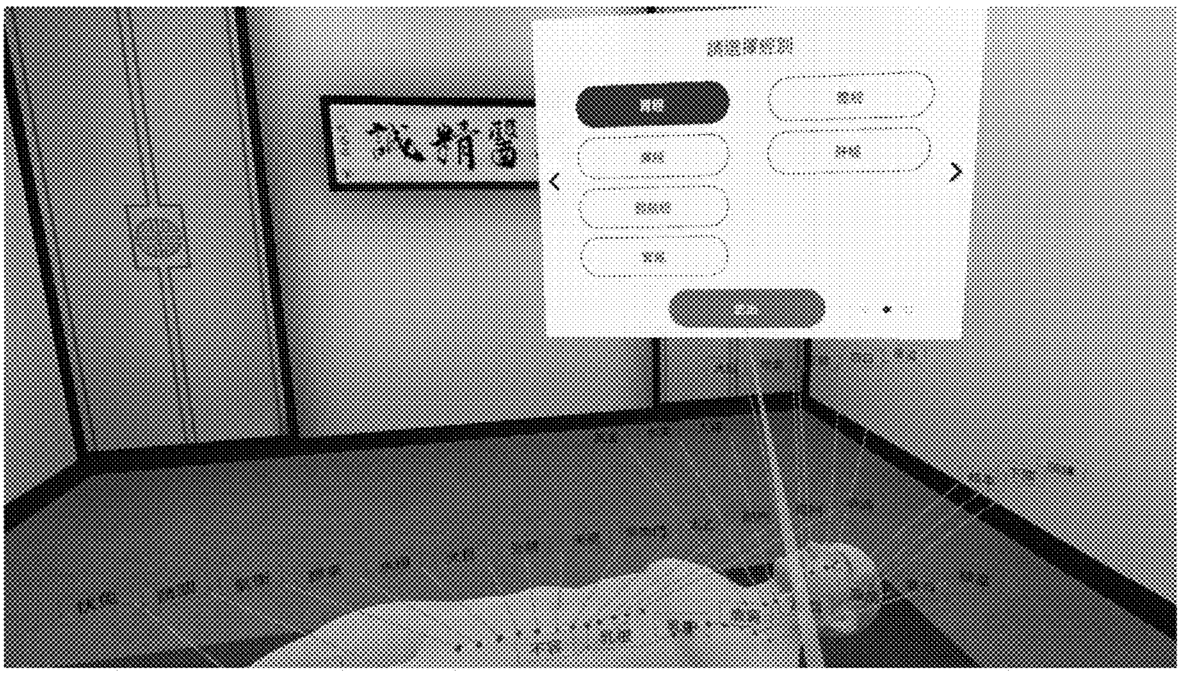
Figure 10:
Figure 11:
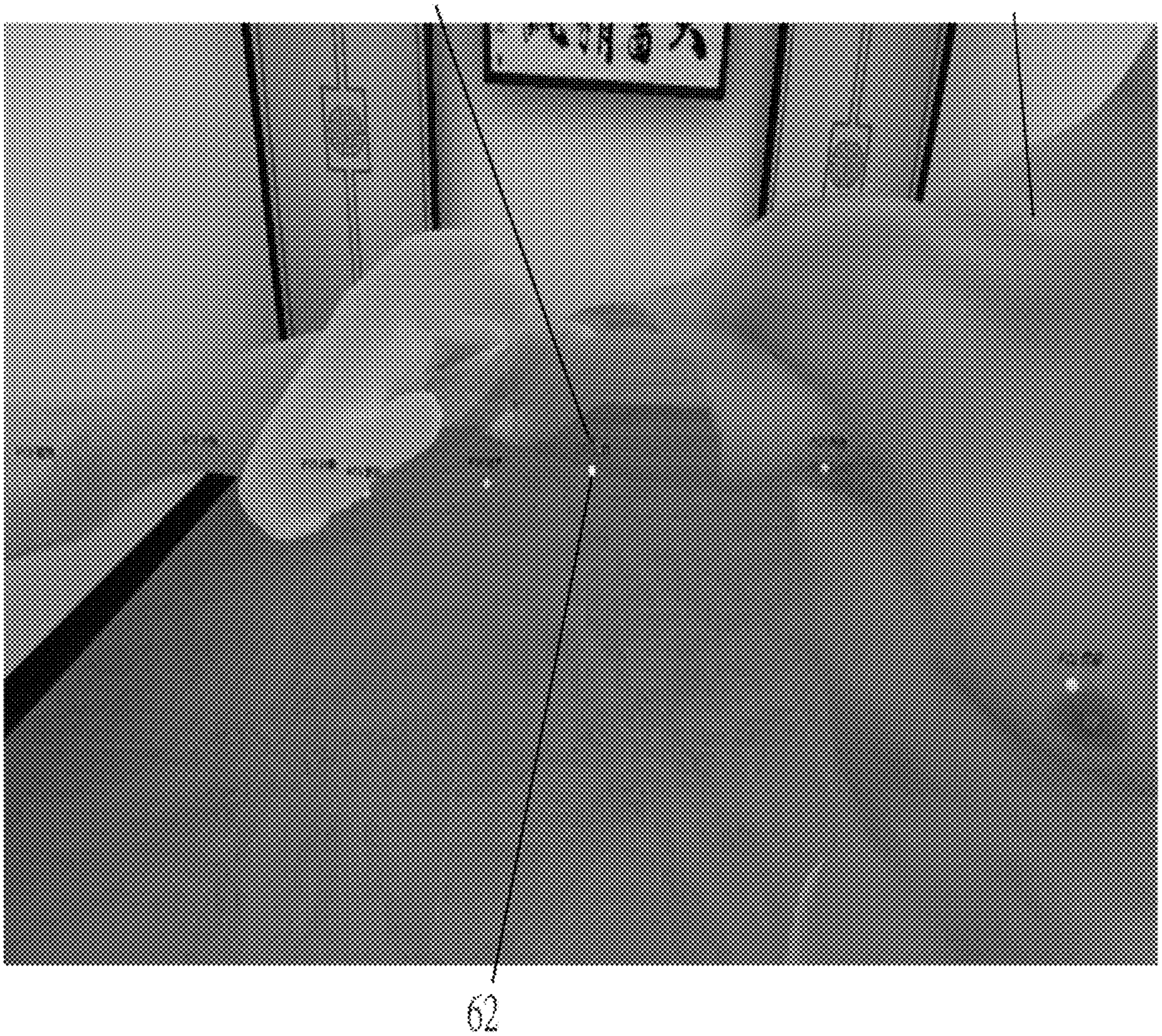
Figure 12:
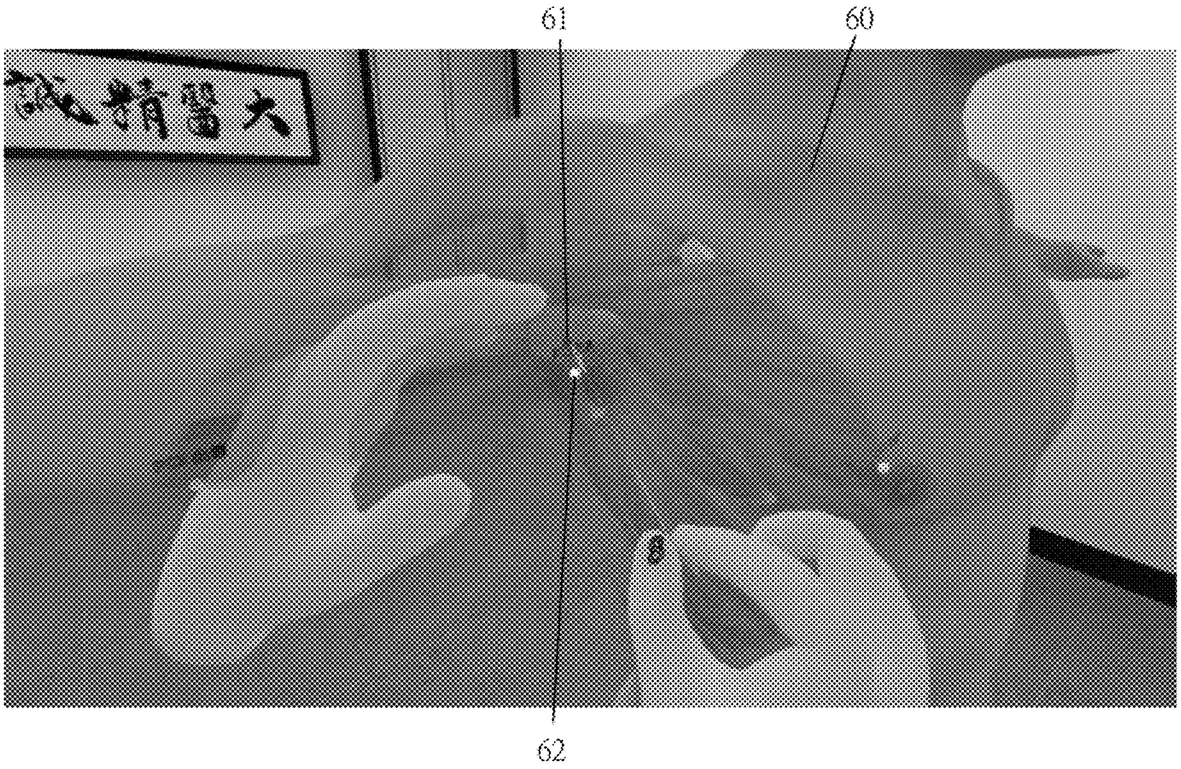

Example 3 of the present invention was performed as follows: the operation of the present embodiment was carried out with an acupoint "Huantiao." As shown in the flow chart in FIG. 5, the function menu was selected to enter the "Basic Mode", the acupoint "Huantiao" on the human acupoint model was selected. Then the lateral position suitable for viewing the acupoint "Huantiao" in the menu was selected, and different sizes of needles was chosen to start acupuncture. The depth of needle insertion would be displayed when the needle is inserted, and the score will be recorded when the needle needs to be pointed to the correct sphere acupoint model 61 squares.

SYMBOL DESCRIPTION

10: virtual reality acupuncture system
20: virtual reality device
21: head-mounted display
22: joystick
23: operator
30: acupoint database
40: computing host
50: virtual scene model
60: human acupoint model
61: spherical acupoint model
62: projection of a spherical acupoint model on the surface of the skin
70: skin distance model

What is claimed is:

1. A virtual reality acupuncture system, comprising:

(a) a virtual reality device comprising a head-mounted display and a joystick, wherein the head-mounted display is configured to display a virtual scene model and a human acupoint model, and the joystick is configured to be controlled by both hands of an operator for tracking hand movements to determine a needle insertion;

(b) an acupoint database for storing acupoint information; and (c) a computing host linked to the virtual reality device and the acupoint database, wherein the computing host is used for performing virtual reality and data transmission, and for executing an acupuncture virtual reality application program, wherein the acupuncture virtual reality application program is configured to render the virtual scene model, the human acupoint model, and a skin distance model, wherein the virtual scene model is configured to simulate the actual condition of the clinic, the human acupoint model is represented by a virtual 3D stereoscopic model and further comprises a spherical acupoint model, the skin distance model generates tactile feedback, through the joystick, based on the insertion depth of the needle into the skin, thereby generating sensation that whether the acupuncture position is within the spherical acupoint model, and the spherical acupoint model comprises a circular sphere area under a certain depth of skin surface of a subject and one or more 3d acupoints is located within a depth, of 0.1-5 cm under the skin surface.

2. The system of claim 1, wherein the human acupoint model is adjustable to different positions based on user actions according to different meridians or acupoints.

3. The system of claim 2, wherein said different positions comprise: sitting in a middle position with elbow flexion, sitting in a middle position with elbows flexion and palms up, sitting in a middle position with elbows flexion and palms down, sitting in a middle position with shoulder abduction, supine position, prone position or lateral position.

4. The system of claim 1, wherein the spherical acupoint model comprises a translucent body surface, wherein the condition of the acupoint and the anatomical structure around the acupoint can be readily observable by the operator.

5. The system of claim 1, wherein the acupuncture virtual reality application program is executable by the computer host to provide: clarify teaching needs, functional planning, process design, situational scene model, 3D human body model, posture position, acupoint position and information, practice and test mode, or UI/UX interface design.

6. The system of claim 1, further comprises a basic test mode, wherein the basic test mode comprises selecting a position posture to achieve a simulated real situation and matching an acupoint based on the selected position.

7. The system of claim 1, further comprises an advance test mode, wherein the advance test mode comprises displaying the acupoints of different meridians in the test, and showing the acupoint position of the different positioning conditions along with the different acupoints in the test.

8. The system of claim 1, further comprises an objective structured clinical examination case construction and scoring unit which creates a virtual reality session in a real classroom setting and provides assessment based on the constructed clinical examination case.

9. The system of claim 8, wherein the clinical examination case construction and scoring unit further comprises: hand washing, self-introduction, indication contraindication identification, positioning requirements, acupuncture process, after taking the acupuncture process and post-acupuncture sanitary education.

10. The system of claim 1, wherein the circular sphere area is defined as a 3D acupoint sphere with a diameter of 0.1-3.0 cm.

11. The system of claim 1, wherein the circular sphere area is defined as a 3D acupoint sphere with a diameter of 0.5 cm.

12. The system of claim 1, wherein the acupoint information comprises position data defined by the World Health Organization's standard acupuncture point locations.

* * * * *